United States Patent Office 2,897,172
Patented July 28, 1959

2,897,172

SALTS OF HYDROLYZED POLYACRYLATE ESTERS AND SOLUTIONS THEREOF

Arthur Maeder, Basel, Switzerland, assignor to Ciba Limited, Basel, Switzerland, a Swiss firm No Drawing. Application October 29, 1954
Serial No. 465,752

Claims priority, application Switzerland
November 5, 1953

11 Claims. (Cl. 260—33.4)

It is known that polymers or copolymers of acrylic acid or methacrylic acid, which polymers or copolymers contain free or neutralized carboxyl groups, can be used as hair fixatives. The products used for this purpose are either soluble in water or alcohol or in a mixture of these two solvents. It is necessary that the polymers should be soluble in water in order that they can be easily removed from the hair. The use of a very wide variety of preparations in the form of an aerosol spray composition has recently found wide application. For this purpose the product is maintained under pressure in a closed vessel in admixture with a polyhalogenated hydrocarbon which is gaseous at ordinary temperature. Upon opening a valve the composition is released from the vessel in the form of very finely divided droplets, which are formed owing to the evaporation of the halogenated hydrocarbon. In order that a product can be made up in this form it must be compatible with the halogenated hydrocarbon used as the propellant. The polymers containing carboxyl groups which have been used hitherto as hair fixatives do not fulfil this requirement. A polymer which is to be used as a hair fixative in the form of an aerosol spray must, on the one hand, be soluble in water, and, on the other it must at least in combination with one other organic solvent be soluble in the hydrocarbon propellant. These two conditions are not fulfilled by the polymerization products of the acrylic acid series hitherto known.

The present invention is based on the observation that polymers of the acrylic acid series which contain carboxyl groups, and of which the alkali and amine salts are soluble in water and are also soluble, at least in combination with another organic solvent, advantageously a water-soluble aliphatic alcohol of low molecular weight, in polyhalogenated hydrocarbons which are gaseous at ordinary temperature, can be made by polymerizing in solution in a water-soluble solvent an acrylic acid ester advantageously an ester of an aliphatic alcohol of low molecular weight, and, if desired, jointly with another polymerizable compound, and subsequently hydrolyzing a proportion of the ester groups sufficient to render a salt of the polymer soluble in water.

The acrylic acid ester is advantageously derived from an alcohol containing one to four carbon atoms. There may be mentioned methyl acrylate, propyl acrylate, isopropyl acrylate, secondary-butyl acrylate, tertiary-butyl acrylate, isobutyl acrylate and especially ethyl acrylate. Furthermore, the ester may be at least partially esterified with a higher alcohol, such as hexyl alcohol. In view of the fact that for the purpose of hair fixation the polymer must possess a certain softness, which must not be too great or too small, and corresponds approximately to the softness of polymers of acrylic acid ethyl ester or acrylic acid methyl ester, it is of advantage in the case of other esters, which yield polymers that are too soft or too hard, to produce a polymer of the desired softness by copolymerization with another suitable component. As such components there may be used the esters of acrylic acid or methacrylic acid mentioned above, and also compounds such as acrylonitrile, acrylic acid amide and substituted acrylic acid amides, also vinyl alkyl ketones, or vinyl-aryl compounds such as styrene.

As water-soluble solvents, in which the polymerization is to be carried out, there are used aliphatic alcohols of low molecular weight, such as methyl alcohol, ethyl alcohol, propyl alcohol or isopropyl alcohol or mixtures of these alcohols. The polymerization is advantageously carried out at a raised temperature, preferably at the boiling temperature of the solvent, and with the addition of a peroxide catalyst which is soluble in the reaction medium, such as benzoyl peroxide, acetyl peroxide, acetyl-benzoyl peroxide, cumene hydroperoxide or tertiary-butyl hydroperoxide.

The partial hydrolysis of the ester groups may be carried out by the usual methods. Advantageously, the solution resulting from the polymerization is subjected directly to the hydrolysis, advantageously with an alkali metal hydroxide dissolved in alcohol. There is preferably used an alcoholic solution of caustic potash. The proportion of the hydrolyzing agent used, in order that the final product shall be soluble in water, depends on the nature of the ester used and of any other polymerizable component that may be present. The proportion can easily be determined by a preliminary test. The solution resulting from the hydrolysis can with advantage be used directly for making an aerosol spray composition. It may be of advantage first to prepare other salts, for example, amine salts such as triethanolamine salts or to convert a part of the neutralized carboxyl groups into free carboxylic acid groups.

In making up the hair fixative compositions there may be incorporated with the polymer solutions the additions which are customary in cosmetics, such as softening agents, perfumes, dyestuffs, gloss-producing agents or evaporation retarders.

For making up aerosol spray compositions there are advantageously used polymer solutions which contain not more than 8–10 percent of polymer, and advantageously those containing about 3–7 percent. For the purpose of diluting the original polymer solution there may be used the same alcohol as that which was used as solvent in the polymerization and hydrolysis. However, the desired concentration may be produced by means of a different alcohol.

In making up an aerosol spray composition the ratio of the polymer solution to the propellant liquid may vary within fairly wide limits. It depends on the moisture content to be imparted to the spray and on the propellant power of the polyhalogenated hydrocarbon used. Advantageously the proportion of the polymer solution is within the range of 30–60 percent, and advantageously about 40–50 percent, of the entire composition.

As propellant liquids there are suitable the halogenated hydrocarbons known in commerce under the name of "Freon," such as trichloro-monofluoromethane, dichlorodifluoromethane or dichloro-tetrafluoroethane. One or other of the aforesaid compounds or a suitable mixture of different compounds is chosen depending on the pressure which it is desired to produce.

The invention includes not only the polymers defined above and their manufacture, but also the manufacture and use of aerosol spray compositions containing such polymers. As stated above, these aerosol spray compositions are suitable for fixing the hair. However, they can also be used as adhesives for other technical purposes.

The following examples illustrate the invention, the parts being by weight:

Example 1

A mixture of 168 parts of ethyl acrylate and 490 parts of ethyl alcohol are heated under reflux. There are then added 1.5 parts of benzoyl peroxide suspended in a small quantity of alcohol, and the polymerization sets in immediately with the evolution of heat. While the polymerization is still in progress, a further 168 parts of ethyl acrylate are run in in the course of 80 minutes, while taking care that the temperature does not fall.

When the addition is complete, the polymerization is continued for a further 5 hours, and two additions each of 0.7 part of benzoyl peroxide are added, one after 20 minutes and the other after 1½ hours. In this manner there is obtained a colorless thinly liquid polymer solution having a polymer content of about 40 percent. The relative flow time of the solution as measured at 20° C. in an Ostwald viscometer is 73.5, the flow time for water being equal to 1.

820 parts of the polymer solution described above are mixed with a solution of 55.5 parts of potassium hydroxide in 2480 parts of ethyl alcohol. For the purpose of hydrolysis the mixture is heated for 6 hours under reflux. At the end of this period the hydrolysis is finished. There is obtained an almost colorless polymer solution having a dry content of about 10 percent. Its relative viscosity at 20° C. is 2.70 (in relation to water=1). The relative viscosity is calculated by the following formula $$z = \frac{t_s d_s}{t_w d_w}$$

$z$ = viscosity
$t_s$ = flow time of the material
$t_w$ = flow time of water
$d_s$ = density of the material
$d_w$ = density of water.

The aerosol spray hair fixative is made up as follows:

24 parts of the polymer solution described in the second paragraph of this example are mixed with 16 parts of isopropyl alcohol, to which a small quantity of a perfume mixture has been added. 40 parts of the resulting solution containing 6 percent of polymer are charged together with 60 parts of a mixture of equal parts of trichloro-monofluoromethane and dichloro-difluoromethane into a pressure vessel provided with a valve.

Example 2

When 490 parts of isopropyl alcohol are used as solvent instead of ethyl alcohol for the polymerization of ethyl acrylate in the manner described in Example 1, operations are carried on in the same way until the addition of the monomer is complete, polymerization is then carried on for 7 hours. When the addition of the monomer is complete, two additions of 0.7 part of benzoyl peroxide suspended in about 3 parts of isopropanol are added, one after 2½ hours and the other after 5 hours.

There is obtained a colorless, thinly liquid polymer solution having a polymer content of 40 percent.

500 parts of this polymer solution are heated with a solution of 40 parts of potassium hydroxide of 84.4 percent strength (commercial potassium hydroxide) in 1470 parts of isopropanol for 6 hours under reflux. The desired hydrolysis is then finished. From the reaction product the solvent is distilled while stirring and under slightly reduced pressure until a resin content of 50 percent is obtained. In this manner about 1400 parts of solvent, chiefly isopropanol, are recovered. The resin solution of 50 percent strength is a viscous liquid which can be diluted to any degree with water or with ethyl alcohol. The relative viscosity of the solution of 10 percent in isopropanol at 20° C. (in relation to water=1) is 4.36.

An aerosol spray hair fixative can be made up as follows:

40 parts of the polymer solution described above of 50 percent strength are mixed with 10 parts of water, 4 parts of ethylene glycol monoethyl ether, 145.6 parts of ethyl alcohol (alcohol of about 96 percent strength) and 0.4 part of a perfume mixture.

60 parts of the resulting solution containing 10 percent of polymer are charged together with 90 parts of a mixture of equal parts of trichloro-monofluormethane and dichloro-difluoromethane into a pressure vessel provided with a valve.

Example 3

A mixture of 19 parts of ethyl acrylate, 1 part of styrene and 58 parts of isopropanol heated under reflux is polymerized by the gradual addition of 0.4 part of benzoyl peroxide suspended in 2 parts of isopropanol. When polymerization has set in, a mixture of 19 parts of ethyl acrylate and 1 part of styrene is run in in the course of 1½ hours and polymerization is carried on for 6½ hours altogether at 80–82° C. There are obtained 99.5 parts of a slightly viscous colorless solution of the copolymer having a resin content of 39.2 percent.

51 parts of this resin solution are heated with a solution of 3.98 parts of potassium hydroxide of 84.4 percent strength in 146 parts of ethyl alcohol under reflux with stirring. At the end of 6 hours the desired partial hydrolysis is finished. The reaction product is a faintly yellow colored clear thin syrupy liquid having a resin content of 10.6 percent. The relative viscosity of the solution of exactly 10 percent in isopropanol at 20° C. is 3.70, in relation to water=1; $d_4^{20}$=0.820.

An aerosol spray hair fixative can be made up as follows:

113.2 parts of the copolymer solution of 10.5 percent strength described above are mixed with 7.5 parts of distilled water, 7.5 parts of ethylene glycol monoethyl ether, 21.5 parts of alcohol and 0.3 part of perfume oil.

40 parts of the resulting solution containing 8 percent of dry substance are charged together with 60 parts of a mixture of equal parts of trichloro-fluoromethane and dichloro-difluoromethane into a pressure vessel provided with a valve.

Example 4

The same method is used as described in Example 3, but instead of 19 parts of ethyl acrylate only 18 parts are used, and instead of 1 part of styrene, 2 parts of methyl methacrylate. When copolymerization has set in, a mixture of 18 parts of ethyl acrylate and 2 parts of methyl methacrylate is added in the course of 1½ hours and polymerization is carried on for 6½ hours altogether at 80–82° C.

The reaction product is a clear, colorless liquid of low viscosity having a dry resin content of 40.0 percent.

For the purpose of partial hydrolysis 50 parts of this resin solution are mixed with a solution of 3.98 parts of potassium hydroxide of 84.4 percent strength in 146 parts of isopropanol and heated under reflux for 6 hours with stirring. There is obtained a nearly colorless, clear, slightly syrupy liquid having a dry content of 11.1 percent and a relative viscosity at 20° of 4.95 in relation to water=1; $d_4^{20}$=0.825.

An aerosol spray hair fixative can be made by mixing 108.1 parts of the above described solution of 11.1 percent strength of the copolymer with 7.5 parts of distilled water, 7.5 parts of ethylene glycol monoethyl ether, 26.6 parts of alcohol and 0.3 part of a perfume oil.

40 parts of the resulting solution containing 8 percent dry substance are charged together with 60 parts of a mixture of equal parts of trichloro-monofluoromethane and dichloro-difluoromethane into a pressure vessel provided with a valve.

Example 5

50 parts of the polymer solution of 40 percent strength described in the first paragraph of Example 2 are heated under reflux for 21 hours at 79–80° C. with a solution of 2.53 parts of lithium hydroxide hydrate (LiOH·H$_2$O) in 146 parts of isopropanol. As reaction product there is obtained a solution of 10.7 percent strength of the lithium salt of a partially hydrolyzed polyethyl acrylate. It is a clear, colorless liquid which on a glass plate dries to a very adhesive colorless, lustrous film.

An aerosol spray hair fixtative can be made by mixing 112.15 parts of the above described solution of 10.7 percent strength of lithium salt of the polymer compound with 7.5 parts of distilled water, 7.5 parts of ethylene glycol monoethyl ether, 22.55 parts of alcohol and 0.3 part of a perfume oil.

40 parts of the resulting solution containing 8 percent of dry substance are charged together with 60 parts of a mixture of equal parts of trichloro-fluoromethane and dichloro-difluoromethane into a pressure vessel provided with a valve.

*Example 6*

121 parts of the alcoholic polyethyl acrylate solution of 40 percent strength described in the first paragraph of Example 1 are mixed with a solution of 5.94 parts of sodium hydroxide of 96.9 percent strength in 350 parts of ethyl alcohol, and the mixture is heated for 6 hours under reflux with stirring. There is obtained a suspension of the sodium salt of a polyethylacrylate hydrolyzed to 30 percent. 16.1 parts of aqueous hydrochloric acid of 32.5 percent strength are added at room temperature and 200 parts by volume of ether, and the whole is cooled to 10° C. After letting it stand for a short time it is filtered off from the precipitated sodium chloride, and the solvent is distilled off completely. As residue there are obtained 43 parts of a colorless elastic somewhat sticky resin which still contains about 1 percent of solid sodium chloride. The resin is dissolved again in about 110 parts of absolute ethyl alcohol with heating on a water bath, the remaining small quantity of sodium chloride precipitating. When cool, the whole is filtered. The clear filtrate contains the free polyethyl acrylate containing carboxyl groups and has a resin content of 28 percent.

For the purpose of conversion into the triethanolamine salt there are added to 71.5 parts of this filtrate 9.88 parts of triethanolamine (of 98.6 percent strength) with stirring and heating to 40° C. and finally diluting the whole with 216.2 parts of absolute ethyl alcohol. There are obtained 297.5 parts of a clear yellow colored solution of the triethanolamine salt of the polyethyl acrylate containing carboxyl groups. The solution has a dry content of 10 percent.

An aerosol spray hair fixative can be made by mixing 120 parts of the above described solution of 10 percent strength of the triethanolamine salt of the polymeric compound with 7.5 parts of distilled water, 7.5 parts of ethylene glycol monoethyl ether, 14.7 parts of alcohol and 0.3 part of a perfume oil.

40 parts of the resulting solution containing 8 percent dry substance are charged together with 60 parts of a mixture of equal parts of trichloro-fluoromethane and dichloro-difluoromethane into a pressure vessel provided with a valve.

What I claim is:

1. A polymer of the acrylic acid ester series which contains carboxyl groups and carboxyl groups esterified with an aliphatic alcohol having at most six carbon atoms, and of which the alkali and triethanolamine salts are soluble in water and are also soluble, at ordinary temperature and in a closed container, at least in combination with another organic solvent, in chloro fluoroalkanes which are gaseous at ordinary temperature and pressure, and which polymer is produced by polymerizing at least one ester of acrylic acid with an aliphatic alcohol having at most six carbon atoms in solution in a water-soluble aliphatic alcohol of low molecular weight, and hydrolyzing subsequently in the resulting polymer solution a sufficient proportion of the ester groups to render the alkali and triethanolamine salts of the polymer soluble in water.

2. A polymer of the acrylic acid ester series which contains carboxyl groups and carboxyl groups esterified with an alcohol containing 1–4 carbon atoms, and of which the alkali and triethanolamine salts are soluble in water and are also soluble at ordinary temperature and in a closed container, at least in combination with another organic solvent, in chloro fluoroalkanes which are gaseous at ordinary temperature and pressure, and which polymer is produced by polymerizing at least one ester of acrylic acid with an aliphatic alcohol containing 1–4 carbon atoms in solution in a water soluble aliphatic alcohol of low molecular weight, and hydrolyzing subsequently in the resulting polymer solution a sufficient proportion of the ester groups to render the alkali and triethanolamine salts of the polymer soluble in water.

3. A polymer of the acrylic acid ester series which contains carboxyl groups and carboxyl groups esterified with an alcohol containing 1–4 carbon atoms and further copolymerized a minor amount of another polymerizable compound and of which the alkali and triethanolamine salts are soluble in water and are also soluble at ordinary temperature and in a closed container, at least in combination with another organic solvent, in chloro fluoroalkanes which are gaseous at ordinary temperature and pressure, and which polymer is produced by polymerizing an ester of acrylic acid with an aliphatic alcohol containing 1–4 carbon atoms together with a minor amount of another polymerizable compound in solution in a water-soluble aliphatic alcohol of low molecular weight and hydrolyzing subsequently in the resulting polymer solution a sufficient proportion of the ester groups to render the alkali and triethanolamine salts of the polymer soluble in water.

4. A polymer of the acrylic acid ester series which contains carboxyl groups, and ester groups derived from ethyl alcohol and further copolymerized a minor amount of styrene, and of which the alkali and triethanolamine salts are soluble in water and are also soluble at ordinary temperature and in a closed container, at least in combination with another organic solvent, in chloro fluoroalkanes which are gaseous at ordinary temperature and pressure, and which polymer is produced by polymerizing ethyl acrylate together with a minor amount of styrene in solution in ethyl alcohol and hydrolyzing subsequently in the resulting polymer solution a sufficient proportion of the ester groups to render the alkali and triethanolamine salts of the polymer soluble in water.

5. A polymer of acrylic acid ethyl ester, which contains carboxyl groups and of which the alkali and triethanolamine salts are soluble in water and are also soluble at ordinary temperature and in a closed container, at least in combination with another organic solvent, in chloro fluoroalkanes which are gaseous at ordinary temperature and pressure, and which polymer is produced by polymerizing ethyl acrylate in solution in a water-soluble aliphatic alcohol of low molecular weight and hydrolyzing subsequently in the resulting polymer solution a sufficient proportion of the ester groups to render the alkali and triethanolamine salts of the polymer soluble in water.

6. A solution in a water-soluble aliphatic alcohol of low molecular weight of a polymer of acrylic acid ethyl ester, which contains carboxyl groups neutralized with a member selected from the group consisting of alkali and triethanolamine, said polymer being soluble in water and also soluble at ordinary temperature and in a closed container, at least in combination with another organic solvent in chloro fluoroalkanes which are gaseous at ordinary temperature and pressure, and which polymer is produced by polymerizing ethyl acrylate in solution in a water-soluble aliphatic alcohol of low molecular weight and hydrolyzing subsequently in the resulting polymer solution a sufficient proportion of the ester groups to render the alkali and triethanolamine salts of the polymer soluble in water.

7. A solution in isopropyl alcohol of a polymer of acrylic acid ethyl ester which contains carboxyl groups neutralized with potassium, said polymer salt being soluble in water and also soluble at ordinary temperature and in a closed container, at least in combination with another organic solvent, in chloro fluoroalkanes which are gaseous at ordinary temperature and pressure, and which polymer is produced by polymerizing ethyl acrylate in solution in isopropyl alcohol and hydrolyzing subsequently in the resulting polymer solution a sufficient proportion of the ester to render the alkali and triethanolamine salts of the polymer soluble in water by means of a solution of potassium hydroxide in solution of isopropyl alcohol.

8. A pressure vessel containing a composition of matter, said composition comprising a solution of a polymer of the acrylic acid ester series which contains carboxyl groups neutralized with a member selected from the group consisting of alkali and triethanolamine, and carboxyl groups esterified with an aliphatic alcohol having at most six carbon atoms, said polymer being soluble in water and being produced by polymerizing at least one ester of acrylic acid with an aliphatic alcohol having at most six carbon atoms in solution in a water-soluble aliphatic alcohol of low molecular weight, and hydrolyzing subsequently in the resulting polymer solution a sufficient proportion of the ester groups to render the alkali and triethanolamine salts of the polymer soluble in water, said solution containing as a solvent at least one chloro fluoroalkane which is gaseous at ordinary temperature and pressure, and a water-soluble aliphatic alcohol of low molecular weight.

9. A pressure vessel containing a composition of matter, said composition comprising a solution of a polymer of acrylic acid ethyl ester which contains carboxyl groups neutralized with a member selected from the group consisting of alkali and triethanolamine, said polymer salt being soluble in water and being produced by polymerizing ethyl acrylate in solution in a water-soluble aliphatic alcohol of low molecular weight and hydrolyzing subsequently in the resulting polymer solution a sufficient proportion of the ester groups to render the alkali and triethanolamine salts of the polymer soluble in water, said solution containing as solvents at least one chloro fluoroalkane which is gaseous at ordinary temperature and pressure and a water-soluble aliphatic alcohol of low molecular weight.

10. A pressure vessel containing a composition of matter, said composition comprising a solution of a polymer of acrylic acid ethyl ester which contains carboxyl groups neutralized with potassium, said polymer salt being water-soluble and being produced by polymerizing ethyl acrylate in solution in isopropyl alcohol and hydrolyzing subsequently in the resulting polymer solution a sufficient proportion of the ester to render the alkali and triethanolamine salts of the polymer soluble in water by means of a solution of potassium hydroxide in solution of isopropyl alcohol and said solution containing as solvents at least one chloro fluoroalkane which is gaseous at ordinary temperature and pressure and isopropyl alcohol.

11. A pressure vessel containing a composition of matter, said composition comprising a solution of a polymer of acrylic acid ethyl ester which contains carboxyl groups neutralized with potassium, said polymer salt being water-soluble and being produced by polymerizing ethyl acrylate in solution in isopropyl alcohol and hydrolyzing subsequently in the resulting polymer solution a sufficient proportion of the ester to render the alkali and triethanolamine salts of the polymer soluble in water by means of a solution of potassium hydroxide in solution of isopropyl alcohol and said solution containing 4 percent of the polymer, 2 percent of water, 0.8 percent of ethylene glycol mono ethyl ether, 0.2 percent of perfume, 4 percent of isopropyl alcohol, 29 percent of ethyl alcohol, 30 percent of trichloro-monofluoromethane and 30 percent of dichlorodifluoromethane.

References Cited in the file of this patent

UNITED STATES PATENTS

| | | |
|---|---|---|
| 2,205,882 | Graves | June 25, 1940 |
| 2,205,883 | Graves | June 25, 1940 |
| 2,244,703 | Hubbuch | June 10, 1941 |
| 2,617,780 | Lutz | Nov. 11, 1952 |
| 2,716,637 | Bunting | Aug. 30, 1955 |
| 2,739,953 | Rogers | Mar. 27, 1956 |